Figure 1:
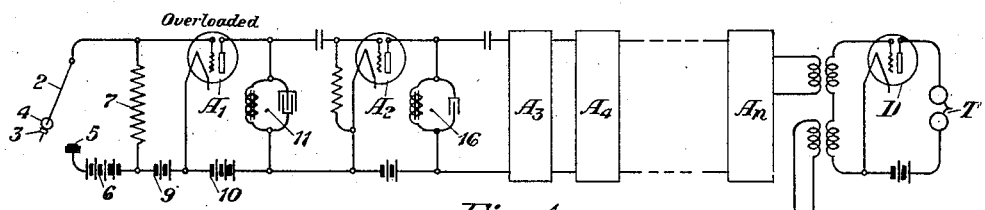

March 13, 1934.  P. I. WOLD  1,951,226

MEASUREMENT OF GRAVITATIONAL FORCES

Filed Aug. 26, 1930

INVENTOR
Peter I. Wold

Patented Mar. 13, 1934

1,951,226

UNITED STATES PATENT OFFICE 1,951,226

MEASUREMENT OF GRAVITATIONAL FORCES

Peter Irving Wold, Schenectady, N. Y.

Application August 26, 1930, Serial No. 477,966

8 Claims. (Cl. 265—1)

This invention relates to the measurement of gravitational and other forces, and more particularly to the detection of small changes therein. One of its purposes is to enable the detection and measurement of very minute changes in such forces. Another purpose is to make possible such detection or measurement in a much shorter time than has been possible heretofore.

The measurement of the force of gravitation and its variations from place to place and under different circumstances has always been considered an important one in the field of physics, and numerous ways have been proposed for such measurements, the results generally having been expressed in terms of "acceleration due to gravity". The most accurate methods have made use of pendulums because of their simplicity and reliability as well as the fact that a pendulum executes nearly simple periodic motion. That is, its time of vibration for small amplitudes is nearly indepedent of amplitude. The necessary relationship in the case of gravitational pendulum is given by $$T = 2\pi\sqrt{\frac{l}{g}}$$

where T is the period of the pedulum, $l$ is a length which depends upon the physical form of the pendulum, and $g$ is the desired acceleration due to gravity. In case of reasonably high accuracy such measurements are tedious, and in any event are not adapted for detecting rapidly changing conditions, for the reason that the pendulum must be allowed to execute quite a large number of vibrations or oscillations in order to get the necessary accuracy as to the period of the pendulum. It might be supposed that a gain in speed would be obtained by having physical pendulums which are very short, in which case the period decreases correspondingly, but little is gained in this direction because of greater uncertainty as to the length to be assigned to the pendulum and increased difficulties in finding the true period.

Briefly, in this invention I overcome these conditions by starting with a pendulum of ordinary length, obtaining an electric wave corresponding to its vibration, distorting this wave if necessary to bring out harmonics, and then comparing one of the harmonic frequencies with a known frequency to yield the true time of the pendulum. In general it will be desirable to obtain a harmonic of high order, and this can best be done in several steps, that is, some moderate harmonic of the fundamental, such as the twentieth, is selected, amplified, and distorted. Thereupon some harmonic of this, such as the twentieth, is selected, amplified, and distorted, and a higher harmonic selected. Thus it is possible, commencing with a pendulum of say one or two cycles per second, to step up to a harmonic whose frequency may be of the order of several thousands or millions. The selected harmonic may now be timed as by comparison with a standard oscillation of about the same frequency in any appropriate way visually or aurally as by the method of beats. Any variations in the force of gravity will be indicated by changes in the beat frequency.

It is to be understood that while I have spoken about and will speak hereinafter of a harmonic of high order as preferable, this invention is not to be restricted in this respect for any harmonic which gives an advantage, even though it be so low as the tenth or lower, is to be considered as coming within the definition of the term "high harmonic".

Figure 2:
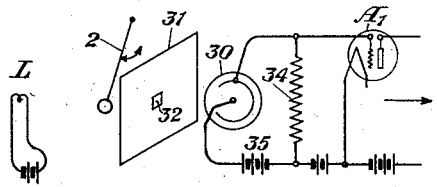
Figure 3:
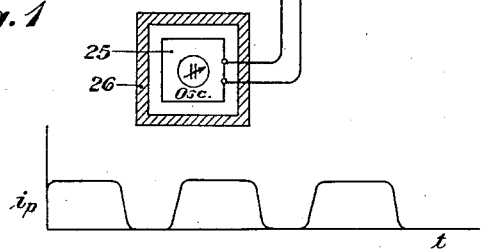
Figure 7:
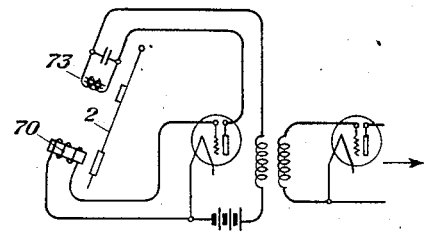
Figure 8:
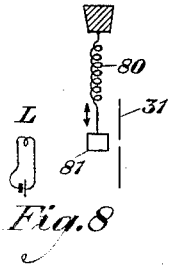

The invention will be better understood by reference to the following specification and accompanying drawing, in which Fig. 1 shows schematically a pendulum with circuit arrangements for selecting a high frequency and comparing it with a known oscillation; Fig. 2 shows a modified apparatus for obtaining an electric wave from the motion of the gravitational pendulum; Fig. 3 illustrates the type of wave impulse which may be obtained at any stage of the process; Figs. 4 to 7 show various modifications by which an electric wave may be obtained corresponding to the motion of the pendulum; and Fig. 8 shows still a further modification in which an oscillating spring system may be used instead of a pendulum.

Referring more particularly to Fig. 1, the pendulum 4 is shown as adapted to cut through a contact such as a mercury drop 5 to close circuit from battery 6 through a resistance element 7. Connected across the element 7 is the input of an amplifier $A_1$ suitably biased by battery 9. In the output of this amplifier is a selective circuit such as a parallel tuned circuit 11 which is tuned for some harmonic such as the ninth harmonic of the fundamental frequency of the pendulum. The amplifier $A_1$ is adjusted by means of the bias 9, the plate battery 10, and by the temperature of the filament so that it is substantially overloaded when an impulse passes through the element 7, thus giving a fairly flat-topped wave rich in harmonics. The selected harmonic is now passed to the input of a second similarly overloaded amplifier $A_2$ in the output circuit of which there is a second selective or tuned circuit 16 tuned to some harmonic such as the nineteenth harmonic of that which had been selected by the tuned circuit; all this in a manner which is well understood in the art. Further steps of amplification, distortion, and selection of the same form may be used, these being indicated by the reference letter $A_3$, $A_4$, $A_n$, the process being continued until a frequency of approximately the desired value has been obtained, such as the one-thousandth or the one-millionth harmonic.

The frequency of this harmonic may now be compared with any standard frequency such as that of a tuning fork in case the vibrations are within the audio range. Still a more flexible and preferable method would be to use an oscillator 25 which is adjustable and may be set to any desired frequency. The output of this oscillator and the output of the last harmonic producer could now be compared by being impressed on the input of a vacuum tube detector D, the output of which contains a telephone T which will then give a note equal to the difference in frequency between the standard and the unknown frequencies, again all in a manner well understood in the art.

In carrying out this invention it will be desirable to have certain adjustments. Thus it would be desirable to be able to modify somewhat the period of the pendulum 2. This may be done in any convenient method which will modify the effective length such, for instance, as a screw nut 3 which, upon turning, will raise or lower the pendulum bob 4. Also it will be important that the oscillator 25 shall not merely be adjustable in itself but shall be of a very high order of constancy. This may be provided in any manner now well known such as using a quartz oscillator for control and by protecting the oscillator from temperature variations by a suitable container 26.

Fig. 2 shows a modification of the pendulum system which is free from any possible irregularities caused by the pendulum 4 cutting through the mercury contact 5. In this Fig. 2 the pendulum 2 is shown oscillating in front of a photoelectric cell 30 of well known construction. Between the pendum and the photoelectric cell is a screen 31 containing an opening 32 through which light from a lamp L passes to the photoelectric cell. This causes a current to flow through the resistance element 34 from the battery 35, thus controlling the current which passes through an amplifier $A_1$. As the pendulum in its oscillations passes across the opening 32, it shuts off the light, and the current through the photoelectric cell drops to zero or a comparatively low value, giving a change in the output current of the amplifier $A_1$ in a manner similar to that described in connection with Fig. 1. The current wave through such an amplifier $A_1$, in either Fig. 1 or Fig. 2, may be of the form shown in Fig. 3, in which current is plotted in the vertical direction and time in the horizontal direction. By suitable adjustments of the voltages supplied to the amplifier, when it shall be overloaded, the resultant curve would be of the form shown in Fig. 3, and by suitable adjustment of the size of the opening 32, the cross-section of the pendulum bob and the amplitude of swing, any desired ratio can be obtained for the periods that current is on and off in the output of the amplifier $A_1$. Having then obtained the first electrical wave, a high harmonic thereof would be obtained in the manner described in connection with Fig. 1.

Figure 4:
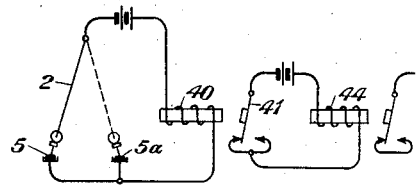

Fig. 4 shows a further modification of the pendulum arrangement. Here the pendulum is shown as cutting through two mercury contacts 5 and 5a to close circuit through relay 40 twice in each complete oscillation. The armature 41 of the relay by making contact both front and back closes circuit through relay 44 with a doubling of frequency. A series of such relays may be used to step up to such frequency as is feasible with relays and thereafter, if desired, still higher harmonics may be obtained through tube circuits of the kind described in connection with Fig. 1.

Figure 5:
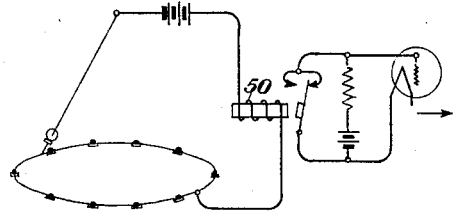
Figure 6:
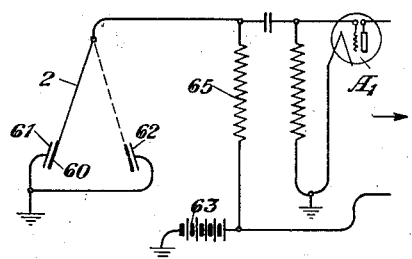

In Fig. 5 still a further modification is given. In this case the pendulum is mounted to swing in a circular path rather than in a plane, and cuts through a plurality of contacts in the course of one cycle, thus closing battery through relay 50 a plurality of times for each complete cycle. The front and back contact arrangement of the armature of the relay 50 will double the frequency, and again this may be applied to further stages of relays of the frequency doubling type or of an amplifier for the purpose and in the manner described in connection with Fig. 1.

Since any mechanical contact with a pendulum may introduce certain irregularities, it may still be possible to obtain the first electrical record from the pendulum without such contact and by means other than the photoelectric cell of Fig. 2. Thus in Fig. 6 the pendulum 2 is shown as having a flat bob 60 which oscillates between two flat plates 61 and 62 comprising condensers. As the pendulum approaches one extreme of its swing to the plate 61, the capacity becomes fairly large, then falls away and rises again as it approaches the plate 62. This periodic increase and decrease in capacity will cause current impulses from the polarizing battery 63 through the resistance element 65 which then may be transferred to the amplifier $A_1$ and the remainder of the harmonic generator. In Fig. 7 a magnetic pick-up 70 is used, the bob 71 of the pendulum in this case being of iron. As the pendulum approaches the coil 70, an induced electromotive force is impressed on the grid of the circuit. Also in this figure I point out that the pendulum may be maintained in oscillation by a feed-back from the plate circuit through the coil 73. By suitably poling the coil 73 the impulse passing through it will be so timed as to maintain the pendulum in oscillation.

While all the description thus far has been confined to a gravitational pendulum, it is to be understood that any type of periodic motion, the frequency of which depends upon the force of gravity, may be used. Thus in Fig. 8 the pendulum has been displaced by an oscillating spring system comprising the spring 80 loaded with the mass 81. As is well known, the frequency of such a system is proportional to the square root of $g$, the acceleration due to gravity, and any variations in this quantity will produce variations in the frequency of the vibrating system. Any suitable method for converting this motion into an electrical wave may be used, and I have indicated here the photoelectric cell method of Fig. 2, there being shown the light L and the screen 31, already described in connection with Fig. 2.

While in Fig. 1 each stage of amplification and harmonic selection has been represented by one tube with its appropriate circuit, it is to be understood that this is illustrative only, for each such stage may consist of a plurality of tubes in tandem or otherwise for the purpose of higher amplification or higher selectivity, or both.

What is claimed is:

1. The method of observing changes of acceleration due to gravity, which consists in obtaining a harmonic of a gravitational periodic system, and comparing the frequency of this harmonic with the frequency of a standard periodic system.

2. The method of observing changes in acceleration due to gravity, which consists in obtaining an impulse from a gravitational pendulum system, distorting this impulse to introduce harmonics, selecting a high harmonic and comparing the frequency thereof with the frequency of some known periodic system.

3. The method of observing acceleration due to gravity, which consists in obtaining impulses from a gravitational periodic system, distorting these impulses to introduce harmonics, selecting a harmonic and finding the beat frequency between this and the frequency of a reference periodic system.

4. In a system for observing gravitational forces, a vibrating pendulum, means for converting the motion of the pendulum into electrical impulses, means for obtaining a high harmonic thereof, and means for comparing the frequency of the harmonic with a known frequency.

5. In a system for observing gravitational forces, comprising a pendulum, a photoelectric cell and a source of light adjacent thereto, the pendulum being so positioned as to periodically shut off light to the photoelectric cell and thus set up a variable electric current, a harmonic frequency generator associated with the photoelectric cell, an oscillator of fixed frequency derived from said electric current, and means for comparing the frequency of the oscillator with a high harmonic of the pendulum frequency.

6. In a system for observing gravitational forces, a vibrating pendulum, means for setting up by the motion of said pendlum a corresponding train of electrical impulses, the fundamental frequency of which is the same as that of the pendulum, means for obtaining a harmonic of said train of electric impulses, and means for observing changes in the frequency of the harmonic as the fundamental frequency changes.

7. The method of observing changes of acceleration due to gravity, which consists in obtaining a high harmonic of a gravitational period and observing variations in the frequency of the harmonic.

8. In a system for observing gravitational forces, a vibrating pendulum, means for setting up by the motion of said pendulum a corresponding train of electric impulses, the fundamental frequency of which is integrally related to that of the pendulum, means for obtaining a high harmonic of said train of electric impulses, and means for observing changes in the frequency of said harmonic as the frequency of the pendulum changes.

PETER I. WOLD.